Jan. 7, 1964     C. PASSAGGIO     3,116,758
3-WAY VALVE
Filed July 25, 1960     2 Sheets-Sheet 1
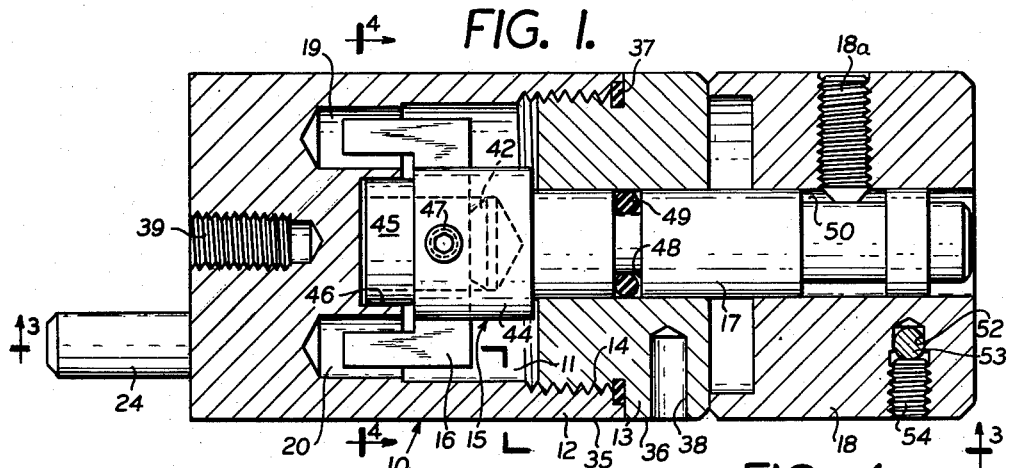
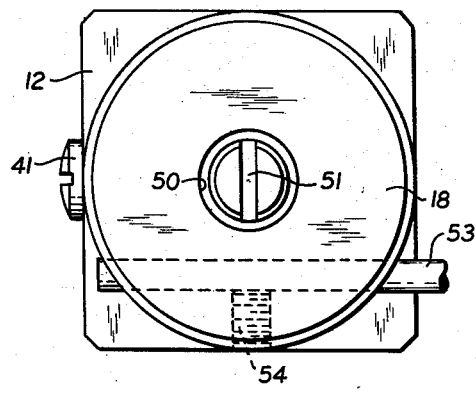
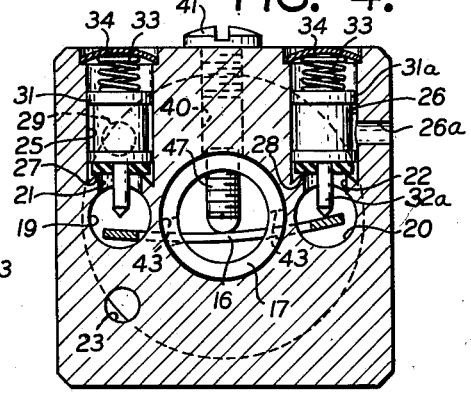
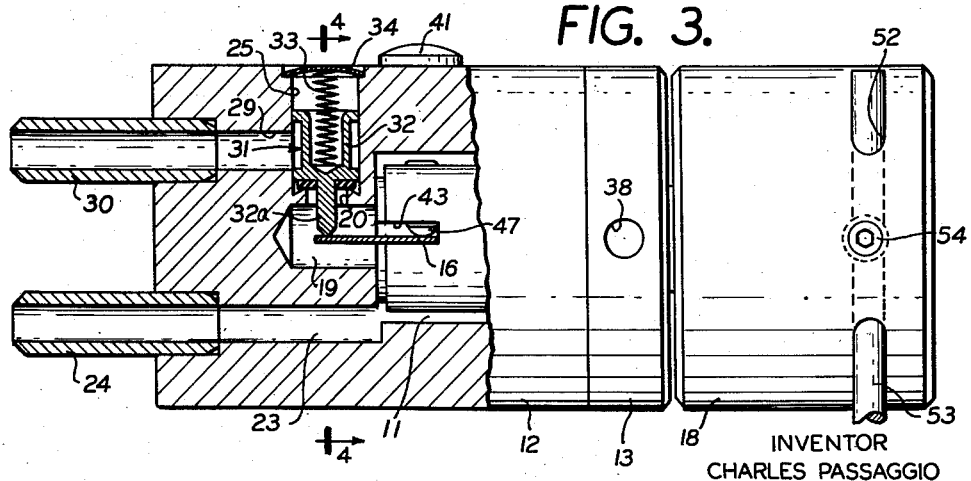
INVENTOR
CHARLES PASSAGGIO
BY
Byerly, Townsend, Watson & Churchill
ATTORNEYS.

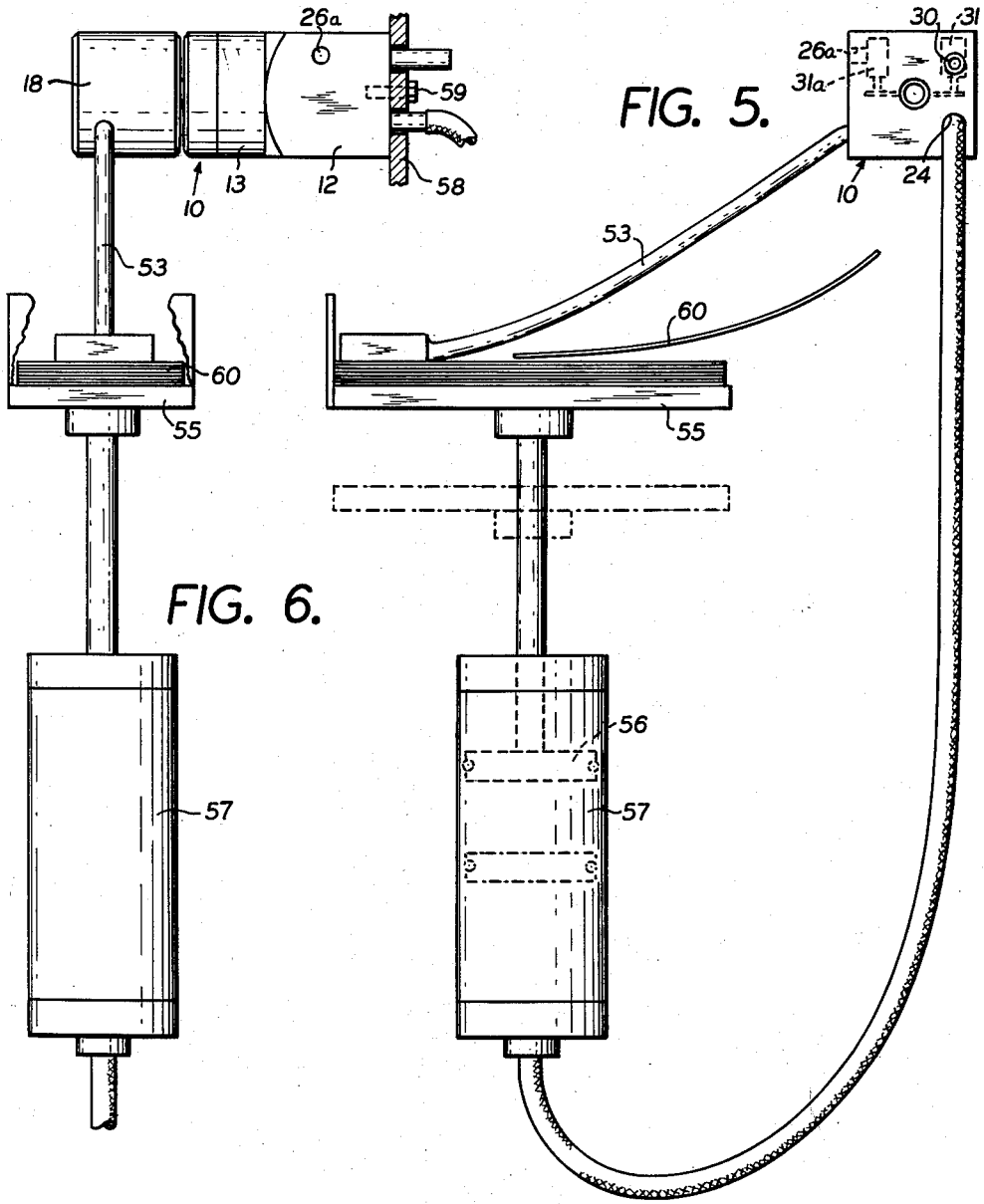

United States Patent Office 3,116,758
Patented Jan. 7, 1964

3,116,758
3-WAY VALVE
Charles Passaggio, Flushing, N.Y., assignor to Scovill Manufacturing Company, Waterbury, Conn., a corporation of Connecticut
Filed July 25, 1960, Ser. No. 45,062
3 Claims. (Cl. 137—627.5)

The present invention relates to a 3-way valve of novel construction. More particularly, it relates to a 3-way valve capable of miscellaneous applications, one of which is in connection with a bank check sorter and in essence is a leveling valve by means of which in a closed loop pneumatic-mechanical system it serves to maintain a stack of checks at a constant height on a receiving platform.

The detailed construction of the valve and the manner in which it functions in a device of the character above set forth will be understood from the detailed description which follows when considered in connection with the accompanying drawings, wherein;

FIG. 1 is a diametrical section through a 3-way valve embodying the present invention;

FIG. 2 is an end elevation of FIG. 1 as viewed from the right hand end thereof;

FIG. 3 is a longitudinal section taken along the planes of the broken line 3—3 of FIG. 1;

FIG. 4 is a transverse section taken along the planes of the lines 4—4 on FIGS. 1 to 3;

FIG. 5 is a schematic elevation showing the use of the valve with a check sorter;

FIG. 6 is a side elevation of the device shown in FIG. 5 as viewed from the left hand side thereof.

Referring first to FIGS. 1 to 4 of the drawings, the reference numeral 10 indicates a housing having an internal chamber 11, said housing consisting of a body member 12 and a cap member 13 screw threadedly connected together as shown at 14. Within the internal chamber 11 is mounted a lever and shaft assembly 15 consisting of a resilient lever 16 carried by a rotatable shaft 17 which latter has mounted thereon a rotor 18 by one or more set screws 18a.

Leading from the internal chamber 11 are a pair of sockets 19 and 20 connecting with passages 21 and 22 respectively, and a passage 23 leading to the exterior of the body member and in which passage 23 in secured a hose connector 24. The passages 21 and 22 lead to enlarged valve chambers 25 and 26 respectively and form with said valve chambers valve seats 27 and 28 respectively. Leading from the valve chamber 25 is a passage 29 and in which passage is secured a hose connector 30 constituting the air inlet of the 3-way valve. In each of the valve chambers 25 and 26 and normally held in seating engagement with the valve seats 27 and 28 respectively are valve seal assemblies or poppet valves 31 and 31a respectively, each comprising a hollow plunger 32 having an axial stem 32a, said plungers providing clearance with the wall of the chambers 25 and 26, respectively, and being held onto their seats by springs 33, the valve chambers each being closed by an expansion plug 34. Leading from the valve chamber 26 to the exterior of the body member 12 is a vent opening 26a.

The body member 12 is of substantially square cross section and whereat it is internally threaded to engage the cap member 13, it is formed with an exterior cylindrical surface 35, to provide a continuation of a cylindrical surface 36 on cap member 13 as best shown in FIG. 6. To provide a leak-tight seal between the body member 12 and the cap member 13, a gasket 37 is positioned therebetween. To facilitate mounting the cap member in the body member while holding the body member and the shaft 17 stationary, the cap member may be formed with one or more wrench sockets 38. Where it is desired to mount and hold the housing 10, against relative rotation to the rotor 18 as will be hereinafter explained, the body member 12 may be provided with a screw threaded socket 39. The body member is also formed with a hole 40 to accommodate a screw driver as will be presently explained and said hole may be screw threaded to accommodate a screw threaded plug 41 for closing the hole.

The lever 16 as best shown in FIG. 1 is of substantially U-shape and is formed of resilient sheet material, the connecting bar or base of the U having a central tab 42. The base of the lever 16 is mounted in a pair of alined radial slots 43 formed in the inner end of the shaft 17 which is hollowed out and the distance between the walls of the slots is greater than the thickness of the resilient sheet material lever to allow for deflection of the lever. Preferably the inner end of the shaft is formed with an enlarged portion 44 and a somewhat reduced terminal portion 45 which latter seats in a socket or bearing recess 46 in the body member 12. To deflect the arms of the U-shaped lever to bring them into desired relation to the ends of the poppet valve stems 32a, the portion 44 of the shaft is provided with a set screw 47 which may be adjusted by a screw driver insertable in the hole 40 in the body member. The shaft 17 intermediate its ends is formed with an annular recess 48 within which is mounted an O-ring packing 49 to provide an air-tight seal between said shaft and the body member 12. The shaft 17 is also formed with a second annular recess 50 for accommodating the set screw of screws 18a to lock the rotor 18 on said shaft. At its free end the shaft 17 may be formed with a kerf 51 for engagement by a screw driver or the like to hold the shaft stationary in relation to the body member 12 in applying and removing the cap 13 to and from said body member.

The rotor 18 has a chordal hole 52 for receiving an arm or lever 53 which may be secured in said hole by a set screw 54.

The 3-way valve as hereinbefore described, without the plug 41 and the rotor 18, is assembled by first inserting the lever and shaft assembly 15 through the cap member 13 from the left hand end thereof as viewed in FIG. 1. The arms of the U-shaped lever are then inserted into the sockets 19 and 20 with the set screw 47 facing the hole 40. Now holding the lever and shaft assembly against rotation relative to the body member, the cap member 13 is screwed into the body member. The rotor 18 is then slipped over the free end of the shaft 17 into abutting engagement with the cap member and secured to the shaft by the set screw 18a. The valve chambers 25 and 26 being sealed off, a hose line is connected to the inlet hose connector 30 and a 1 cu. in. tank to hose connector 24, a pressure gauge being mounted in the hose line between the said tank and connector 30. Air pressure at 8 p.s.i. is then applied to valve chamber 25 through hose connector 30. The set screw 47 is then turned clockwise to apply force to the center of the base of the U-shaped lever 16 to deflect the arms of the U until the poppet valve 31 in chamber 25 is unseated, whereupon air will leak into the internal chamber 11. The screw 47 is then turned counter clockwise until leakage into chamber 11 stops. The closure screw plug 41 is then inserted in place. This adjustment of the lever 16 in which both poppet valves normally remain seated is the neutral position and may be varied to suit the intended end use of the 3-way valve. From said neutral position the poppet valves 31 and 31a will be opened when the rotor 18 is rotated counterclockwise or clockwise respectively. The lost motion of rotation in unseating the poppet valves 31 (FIG. 4) may be termed the angular neutral motion of the lever 16. To test for leakage, the rotor 18 is turned clockwise to again unseat poppet valve 31 whereupon air will fill the internal chamber 11 and the gauge should read 8 p.s.i. The rotor is then released. To be in proper working order, a pressure drop of ½ p.s.i. in 10 seconds is permissible. The plugs 34 are then inserted and flattened down to seal the poppet valve chambers.

In FIGS. 5 and 6 there is shown an application of the 3-way valve in a pneumatic-mechanical system for maintaining a stack of checks at a constant height on a receiving platform in which system a platform 55 supported on a floating plunger 56 is mounted in a cylinder 57 which is pneumatically connected to hose connector 24 leading from the internal chamber 11 containing air under pressure supplied thereto through the hose connector 30 while poppet valve 31 is held unseated by an arm of the U-shaped lever 16. Preferably the 3-way valve is supported on a standard 58 by a screw 59 engaging in the screw threaded opening 39 in the body member 12.

In the operation of the pneumatic-mechanical system illustrated in FIGS. 5 and 6, the 3-way valve is so adjusted that when air under a predetermined pressure e.g. about 8 p.s.i. is in the internal chamber 11, and in the cylinder 57, both poppet valves 31 and 31a will be seated and the U-shaped lever will be in a neutral position out of engagement with either of the valve stems 32a. In the set-up as shown in FIG. 5 the weight of the lever 53 will normally have rotated the lever and shaft assembly counter clockwise and holds the inlet poppet valve 31 in valve chamber 25 open. Bank checks or the like 60 are then fed to platform 55 beneath the free end of the lever 53 where they build up in height. As the height of the checks builds up on the platform, the free end of lever 53 is progressively raised to rotate the rotor in a clockwise direction to first permit valve 31 to close and then to unseat the poppet valve 31a in the valve chamber 26 to vent a limited quantity of air from the chamber 11 and consequently from the cylinder 57 to reduce the pressure therein. When the pressure is sufficiently reduced the platform moves downwardly slightly and the lever 53 due to its weight follows in contact with the topmost check. Such movement permits the poppet valve 31a to again seat. This action is periodically repeated in rapid succession until the plunger descends to a position where an alarm may be sounded to notify an attendant to remove the stack of checks or whereat such stack of checks may be automatically removed. As soon as the checks are removed from the platform the platform rises to its upper limit and the lever 53 descends into engagement with the platform and in doing so rotates the U-shaped lever in a counter-clockwise direction to unseat the inlet poppet valve 31 and provide for the periodic repetition of the cycle.

Although one specific application of the 3-way valve of the present invention has been shown and described, it is to be understood that the invention has manifold applications and that changes in the specific construction of the 3-way valve may be made within the range of enginering and mechanical skill without departing from the concept disclosed and as defined in the appended claims.

What I claim is:

1. A 3-way valve assembly comprising a housing having therein a chamber with passages leading from said chamber to the exterior of the housing, valve means controlling the passage of air under pressure into and out of two of said passages, said valve means being spring-biased to seat in a direction toward the chamber, a rotatable shaft mounted within said housing and having part thereof extending into said chamber, a U-shaped resilient lever mounted transversely on an open end of the shaft which extends into said chamber for selectively opening said valves as the shaft is oscillated about its axis depending on the direction of rotation of the shaft, the arms of said U-shaped lever being deflectably adjustable to a neutral position in spaced relation to said valves by applying tension to the base or cross-arm of the lever, whereby to permit limited rotational movement of the shaft before said means become operative to open the valves.

2. A valve assembly according to claim 1 wherein the end of the rotatable shaft is hollow and the base or cross-arm of the U-shaped lever is mounted in opposed radial slots in said hollow end of the shaft.

3. A 3-way valve assembly comprising a housing having therein a chamber with passages leading from said chamber to the exterior of the housing, separate valves controlling the flow of air under pressure into and out of two of said passages, said valves being spring-biased to be normally closed and seat in a direction toward the chamber, a rotatable shaft mounted within said housing and having a part thereof extending into said chamber, a substantially U-shaped lever mounted diametrically on said part of the shaft which extends into said chamber, the arms of the U extending longitudinally of the shaft and being adjustable from the exterior of the housing out of their diametrical relationship to said shaft to neutral positions normally out of operative relation to the shaft for selectively opening said valves as the shaft is oscillated about its axis depending upon the direction of rotation of the shaft, whereby a limited rotational movement of the shaft is necessary before said lever becomes operative to open the valves.

References Cited in the file of this patent

UNITED STATES PATENTS

| 1,588,659 | Christensen | June 15, 1926 |
| 2,967,547 | Pribonic | Jan. 10, 1961 |
| 3,037,788 | Haddad | June 5, 1962 |

OTHER REFERENCES

German application 1,072,418, Dec. 31, 1959.

UNITED STATES PATENT OFFICE
CERTIFICATE OF CORRECTION

Patent No. 3,116,758 January 7, 1964

Charles Passaggio

It is hereby certified that error appears in the above numbered patent requiring correction and that the said Letters Patent should read as corrected below.

Column 1, line 29, for "FIGS. 1 to 3" read -- FIGS. 1 and 3 --; column 2, line 30, for "of" read -- or --; column 4, line 40, for "shaft" read -- valves --.

Signed and sealed this 2nd day of June 1964.

(SEAL)
Attest:

ERNEST W. SWIDER
Attesting Officer

EDWARD J. BRENNER
Commissioner of Patents